United States Patent [19]

Fell

[11] Patent Number: 5,027,231
[45] Date of Patent: Jun. 25, 1991

[54] METHOD OF SETTING THE TAPE PITCH OF A MAGNETIC TAPE PLAYBACK EQUIPMENT BY ADJUSTING TAPE GUIDES

[75] Inventor: Wolfgang Fell, Seeheim, Fed. Rep. of Germany

[73] Assignee: BTS Broadcast Television Systems GmbH, Darmstadt, Fed. Rep. of Germany

[21] Appl. No.: 394,588

[22] Filed: Aug. 16, 1989

[30] Foreign Application Priority Data

Aug. 31, 1988 [DE] Fed. Rep. of Germany ....... 3829972

[51] Int. Cl.$^5$ ............................................. G11B 15/61
[52] U.S. Cl. ................................... 360/71; 360/130.23
[58] Field of Search ................ 360/70, 71, 84, 130.22, 360/130.23, 130.24

[56] References Cited

U.S. PATENT DOCUMENTS 4,573,619 3/1986 Grant ................................... 226/190
4,703,370 10/1987 Inoue et al. ................. 360/130.24 X
4,709,280 11/1987 Delacou ............................ 360/70 X Primary Examiner—Vincent P. Canney
Assistant Examiner—David L. Robertson
Attorney, Agent, or Firm—Frishauf, Holtz, Goodman & Woodward

[57] ABSTRACT

For setting of the static track angle by the adjustment of the tape pitch with respect to the scanning midplane in an initializing playback operation of a magnetic tape recording and playback equipment the course of signal amplitude over a track exhibited by an envelope signal derived from recorded signals is first used to regulate a capstan servo system so as to place an envelope maximum at a track middle. Then the tape pitch is adjusted by means of the tape guide rollers adjacent to the rotary scanning device so as to bring the envelope signals at the track ends up to the value of the maximum previously placed at the track middle. No special magnetic head is needed for this adjustment method.

3 Claims, 3 Drawing Sheets

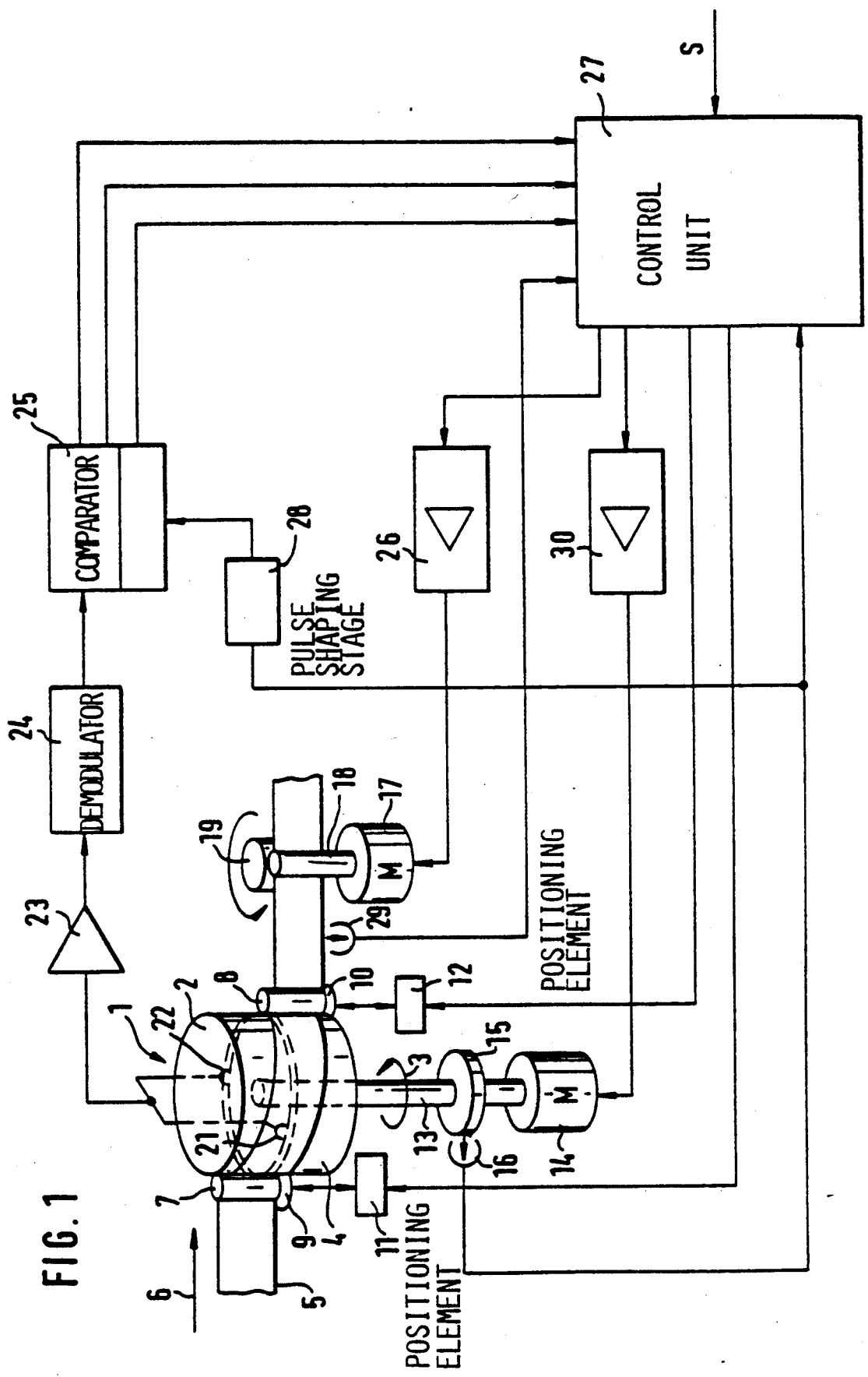

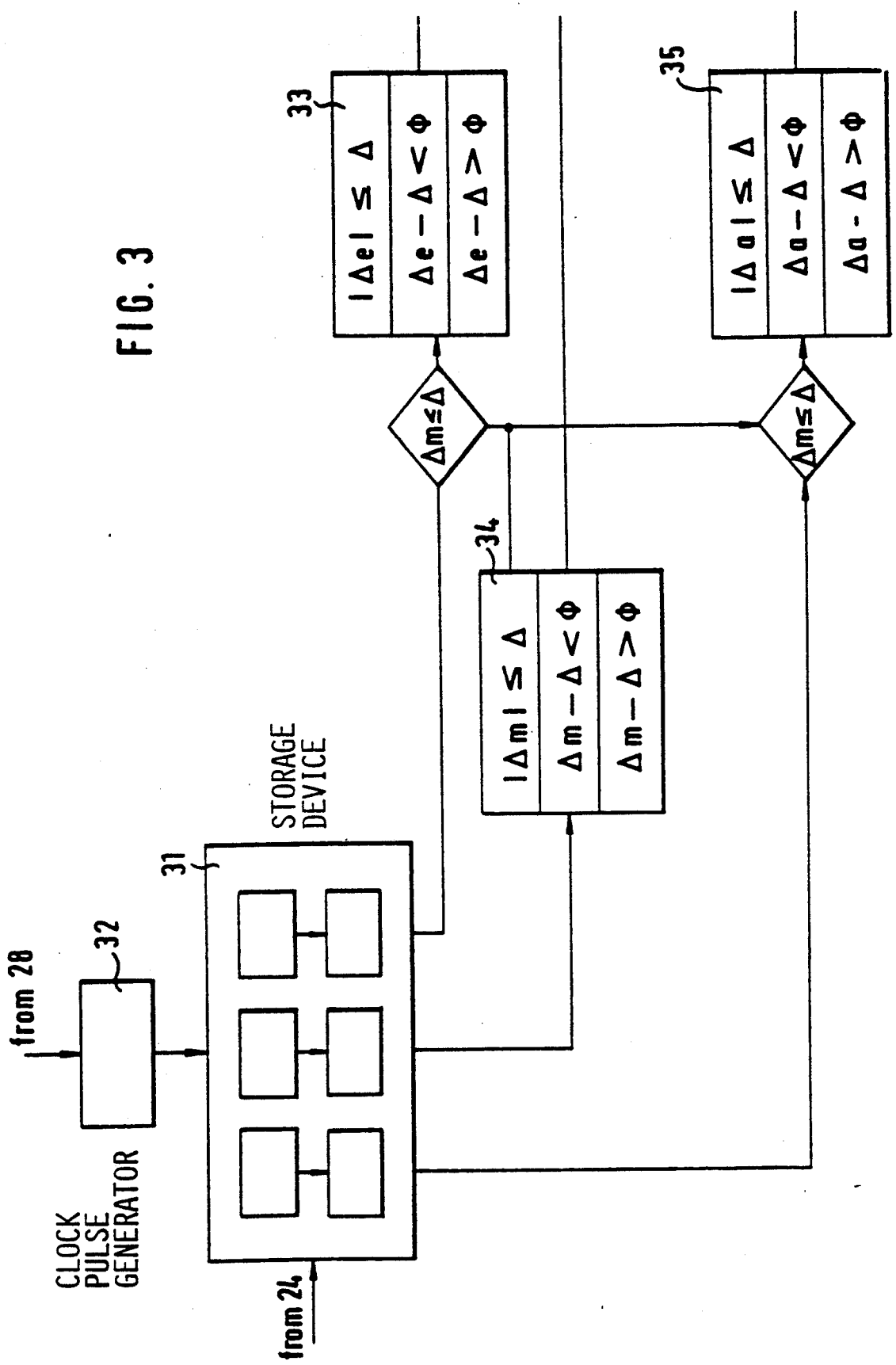

METHOD OF SETTING THE TAPE PITCH OF A MAGNETIC TAPE PLAYBACK EQUIPMENT BY ADJUSTING TAPE GUIDES

This invention concerns a method of setting a tracking adjustment for a magnetic tape recording and playback equipment including a rotary tape scanner, around the peripheral surface of which a magnetic tape is helically looped, a magnetic head servo system having a driving motor for rotating the scanner, at least one playback magnetic head at the periphery of the scanner for reading data signals recorded on oblique tracks of the tape, a tape transport drive for the tape including a capstan coupling to the tape, a capstan servo system for regulating the tape transport drive, a device for determining the momentary rotary phase of the scanner and an electrically controllable mechanism for adjusting the helical pitch of the tape for setting the scanning track angle of the scanner by height adjustment of the tape guides at entrance and exit ends of the tape loop around the scanner.

A known method of making such a tracking adjustment, disclosed in U.S. Pat. No. 4,573,619, provides for adjusting the helical pitch of the tape for setting the scanning track angle of the scanner by height adjustments of the tape guides in a dynamic fashion by a regulation signal obtained from a supplementary magnetic head which rotates on the scanner and has a wider track width than the normal playback magnetic heads. Not only must an additional magnetic head of a special kind be provided in this equipment, but it must be set at a predetermined azimuth angle on the scanner.

SUMMARY OF THE INVENTION

It is an object of the present invention to provide a method of setting the above-mentioned tracking adjustment which does not require a supplementary magnetic head for obtaining the control signal of the tracking adjustment.

Briefly, an amplitude envelope signal is derived from the data signals produced by one or more playback heads. If the tracking is not perfect the amplitude will not be constant along the track. Assuming that the amplitude varies, the capstan servo is then regulated so that the envelope signal has a maximum near or at the middle of each of a succession of tracks. When the tape pitch adjusting mechanism is set so that at the track beginning and at the track end the amplitude is substantially equal to the maximum previously found at the track middle, so that the envelope signal corresponds to constant amplitude over the track length, the adjustment is complete.

The invention has the advantage that the control signals are obtained without the necessity of a supplementary special magnetic head on the scanner. Since magnetic tape equipment for recording playback of data signals usually provide several playback heads on the rotary scanner, it is most inconvenient to provide an additional magnetic head.

The method of the invention can be carried out in automatic steps. Thus the steps of regulating the capstan servo system and then regulating the tape pitch adjustment can be performed by regulation signals derived from comparisons of amplitude values respectively at the track beginning, track middle and track end of two successive tracks. It is furthermore advantageous to apply such regulation signals to the capstan servo system or to the tape pitch adjustment mechanism only if a predetermined value of differences is detected in the comparisons of amplitude values.

BRIEF DESCRIPTION OF THE DRAWINGS

The invention is further described by way of illustrative example with reference to the annexed drawings, in which:

FIG. 1 is a block circuit diagram for explaining the method of the invention;

FIG. 3 is a block circuit diagram of a comparator utilized in the equipment of FIG. 1.

DESCRIPTION OF THE ILLUSTRATED EMBODIMENTS

Figure 2A:
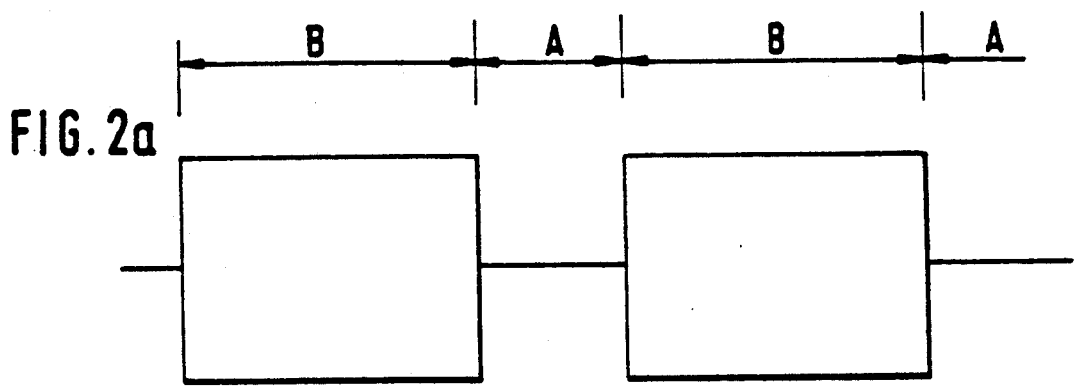
FIGS. 2a, 2b and 2c respectively show different types of envelope signals obtained from playback of a data signal corresponding to different track angles.

For some time in the past instrumentation recorders were used for recording and reproduction of data signals in which the data signals were recorded in longitudinal tracks on magnetic tape. In such equipment it was very easy to alter the data rate of the data signal by altering the magnetic tape advance speed. The scanning speed of instrumentation recorders, however, could not be raised to meet modern requirements and in consequence magnetic tape equipments with rotary scanners displaced them in practice because their scanning speeds were greater. Such magnetic tape equipments record tracks running obliquely to the tape edge. In such equipment, however, no simple data rate changes could be carried out as had been done with the older instrumentation recorders. If the playback speed deviates from the recording speed, the playback magnetic head crosses the recorded tracks more or less gradually. At the same time the error rate of the reproduced data signal rises. It is therefore necessary to make proportional changes of the tape transport speed and of the rotary speed of the magnetic heads if the magnetic heads are to track the recorded signals. On account of mechanical tolerances required even in precision manufacture it is not possible to guide the playback magnetic head exactly on the recorded tracks. Especially in professional equipment, it is therefore important to be able to provide a precise tracking adjustment.

In accordance with a method of the invention, the static track angle, which corresponds to the pitch of the tape in its helical loop around the scanner relative to the plane of revolution of the scanner, can now be set during an initialization phase of the magnetic tape equipment.

FIG. 1 shows a rotary scanning equipment 1 which has a rotary body 2 which turns in the direction of an arrow 3. In this example the rotary body 2 is a revolving drum which is flush with a stationary drum 4. The rotary body 2, the actual scanner, has a magnetic tape 5 looped around it helically. Two guiding rollers 7 and 8 guide the tape which arrives in the direction 6, so as to loop around the drums 2 and 4 and then leave the drums as shown. These guide elements 7 and 8 have flange-like edges 9 and 10 for guiding the tape. The guide edges 9 and 10 are shiftable in the axial direction of the guide elements 7 and 8 by means of controllable positioning elements 11 and 12.

The rotary drum 2 is rotated by a drive shaft 13 which is driven by a head motor or scanner motor 14. The drive shaft 13 carries a tachodisk 15 for measuring the rotary phase of the body 2 by means of a magnetic head 16 directed to respond to the tachodisk 15. The advance of the magnetic tape 5 is produced by a shaft 11 driven by a capstan motor 18 and assisted by a rubber pressure roller 19. On the circumference of the rotary body magnetic heads are fastened in a separation gap shown in FIG. 1 by broken lines separating the rotary drum 2 and the fixed drum 4. In order to simplify the drawing, only two magnetic heads 21 and 22 are shown in FIG. 1, rather symbolically, and both may be assumed to be usable both for recording and reproducing of data signals.

In playback operation the data signal obtained by the magnetic heads 21 and 22 is preamplified in an amplifier stage 23 and compensated for distortion. The data signal thus prepared is then demodulated in a stage 24 for deriving an envelope signal of the received data signal. The envelope signal is supplied to a comparator 25. The comparator 25 will be described in more detail with reference to FIG. 3. The outputs of the comparator 25 are connected with a control unit 27 which is a part of a known kind of magnetic head and capstan servo system. The tachosignal obtained by the magnetic head 16 from the tachodisk 15 is supplied to the control unit 27 for control of the magnetic head servo. According to the momentary phase of rotation of the drum 2 a corresponding rotary speed regulation of the head motor 14 takes places with the assistance of an amplifier stage 30. The tachosignal is also provided to a component 28, yet to be described, and thento the comparator 25 for displacement measurement.

A control track (not shown) running longitudinally on the magnetic tape 5 is read by a magnetic head 29 to produce control track pulse signals from the tape 5 and these are supplied to the control unit 2 for regulation of the capstan servo. The adjustment elements 11 and 12 for height adjustment of the edges 9 and 10 are controlled by signals of the control unit 27. The operation for adjusting the static track angle is started by a signal applied at S during an initialization phase of the equipment.

Figure 2B:
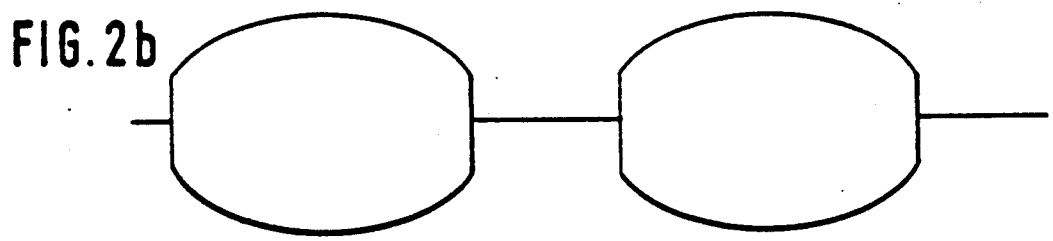
Figure 2C:
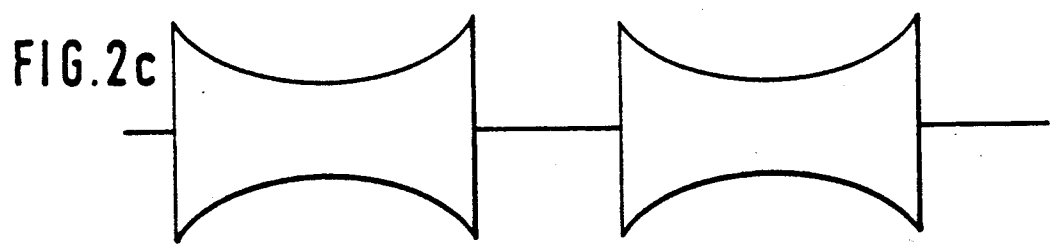

For understanding of the manner of operation of the illustrated equipment, it should be assumed that the magnetic heads 21 and 22 first exactly track the recorded tracks while reading the recorded data signals. FIG. 2a shows an envelope of the data signal obtained at the output of the demodulator 24. The interval during which a magnetic head is in contact with the tape 5 is designated B in FIG. 2a. Intervals without head-to-tape contact are designated A. FIG. 2b shows an envelope for the case in which the playback magnetic head does not fully trace the recorded track at the track beginning and at the track end, so that the envelope of these positions is correspondingly damped in amplitude. The magnetic head correctly traces the recorded track in the middle of the track, so that here a maximum of the envelope results. In contrast to FIG. 2b, the envelope signal shown in FIG. 2c shows the result when the playback magnetic head is on track at the track beginning and at the track end but deviates from the recorded track in the track middle.

In FIG. 3 the comparator 25 as shown in FIG. 1 is shown in more detail. The envelope signal obtained from the demodulator 24 is supplied to a storage device 31 that contains six storage locations. In these storage places there are stored the amplitude values of the envelopes of two scanned tracks for the track beginning, track middle and track end. If the amplitude value of the more recently read track differs from that of the preceding one by more than a predetermined difference d (delta), the track angle adjustment mechanism utilizing the positioning elements 11 and 12 and/or the capstan servo are regulated stepwise. In accordance with the method of the invention the capstan servo is first regulated in such a way that the amplitude of the envelope signal shows a maximum in the track middle. Thereafter, a track angle adjustment is made by means of the positioning elements 11 and 12 so that the envelope signal at the track beginning and track end, with reference to a track scan, has an amplitude that matches the magnitude of the maximum which appears in the track middle. The control takes place in steps which are timed by a clock pulse generator 32. The clock pulse generator is synchronized by the tachosignal obtained from the magnetic head 16 which is prepared for that purpose in the unit 28 which may be a pulse shaping stage. The above-described regulation operation requires a certain amount of time. It has therefore been found desirable to carry out individual measurements in timewise steps which correspond to an interval required for several successive track scans. Thus a measurement is made in a first step and then in a second step the comparison is carried out, after which in a third step the adjustment corresponding to the amount of the deviation shown is carried, after which the procedure is repeated. If the predetermined difference threshold d is approached but not understepped, no further adjustment is made. If, on the other hand, a negative overstepping of the difference threshold d takes place, an adjustment is made in the opposite direction. The necessary decisions on the basis of the amplitude differences that are found and the prescribed difference threshold d are performed, in the manner already described, in the circuit blocks 33, 34 and 35. At the output of the blocks 33, 34, 35 signals are available which designate the results of the decisions made and regulate the system by means of control unit 27 in the direction of regulation.

Various changes and modifications may be made within the inventive concept.

I claim:

1. A method of setting a tracking adjustment for an oblique track magnetic tape recording and playback equipment including a rotary tapescanner around the periphery surface of which a magnetic tape is helically looped, a magnetic head servo system having a driving motor for rotating said scanner, at least one playback magnetic head at the periphery of said scanner for reading data signals received on oblique tracks of said tape including a capstan coupling to said tape, a capstan servo system for regulating said tape transport drive, means for determining the momentary rotary phase of said scanner and means for adjusting the helical pitch of the tape for setting the scanning track angle of said scanner by height adjustment of tape guides at entrance and exit ends of the tape loop around said scanner, said method comprising the steps of:

deriving an amplitude envelope signal from the data signal produced by said at least one playback head;

regulating the capstan servo system so that said envelope signal has a maximum near or at the middle of each of a succession of tracks, and thereafter setting said tape pitch adjusting means by height adjustment of said tape guides to that the amplitude of said envelope signal, at the track beginning and at the track end, with reference to a track scan, is substantially equal to said maximum at or near the track middle.

2. The method of claim 1, in which the steps of capstan servo system regulation and tape pitch adjusting means are performed with regulation signals derived from comparisons of amplitude values respectively at the track beginning, track middle and track end of two successive tracks.

3. The method of claim 2, wherein regulation signals are applied to said capstan servo system and/or to said tape pitch adjusting means only when a predetermined value of difference is detected in said comparisons of amplitude values.

* * * * *